United States Patent [19]
Daane et al.

[11] Patent Number: 5,818,830
[45] Date of Patent: Oct. 6, 1998

[54] METHOD AND APPARATUS FOR INCREASING THE EFFECTIVE BANDWIDTH OF A DIGITAL WIRELESS NETWORK

[75] Inventors: John Daane, Saratoga; Michael D. Rostoker, Boulder Creek; Sandeep Jaggi, San Jose, all of Calif.

[73] Assignee: LSI Logic Corporation, Milpitas, Calif.

[21] Appl. No.: 581,743

[22] Filed: Dec. 29, 1995

[51] Int. Cl.⁶ .................................................. H04B 7/212
[52] U.S. Cl. .......................... 370/347; 370/349; 370/344; 370/445; 370/468
[58] Field of Search ..................................... 370/329, 330, 370/341, 344, 345, 347, 349, 442, 445, 412, 428, 429, 431, 447, 468, 477, 319, 521; 455/422, 446, 450, 451, 452–454, 512, 527, 514

[56] References Cited

U.S. PATENT DOCUMENTS

| | | |
|---|---|---|
| 4,823,340 | 4/1989 | Grassman et al. . |
| 4,831,373 | 5/1989 | Hess ................................... 340/825.03 |
| 4,987,571 | 1/1991 | Haymond et al. ...................... 370/445 |
| 5,034,993 | 7/1991 | Sasuta et al. . |
| 5,048,057 | 9/1991 | Saleh et al. . |
| 5,077,828 | 12/1991 | Waldroup . |
| 5,216,427 | 6/1993 | Yan et al. ................................ 342/352 |
| 5,231,634 | 7/1993 | Giles et al. . |
| 5,239,545 | 8/1993 | Buchholz . |
| 5,274,841 | 12/1993 | Natarajan et al. ....................... 370/445 |
| 5,276,703 | 1/1994 | Budin et al. ............................. 370/445 |
| 5,313,461 | 5/1994 | Ahl et al. . |
| 5,446,735 | 8/1995 | Tobagi et al. ........................... 370/445 |
| 5,463,623 | 10/1995 | Grimes et al. . |

FOREIGN PATENT DOCUMENTS 0622925  2/1994  European Pat. Off. .

*Primary Examiner*—Ajit Patel
*Attorney, Agent, or Firm*—Oppenheimer Wolff & Donnelly LLP

[57] ABSTRACT

A plurality of devices communicate information over a wireless network at radio frequencies. The information includes digital audio, video and data. Bandwidth among the devices is dynamically allocated, the allocation being based upon the needs of the devices. One embodiment of the wireless network is a Time Division Multiple Access network. Another embodiment is a wireless Ethernet. Yet another embodiment is a Frequency Division Multiplexed network.

26 Claims, 3 Drawing Sheets

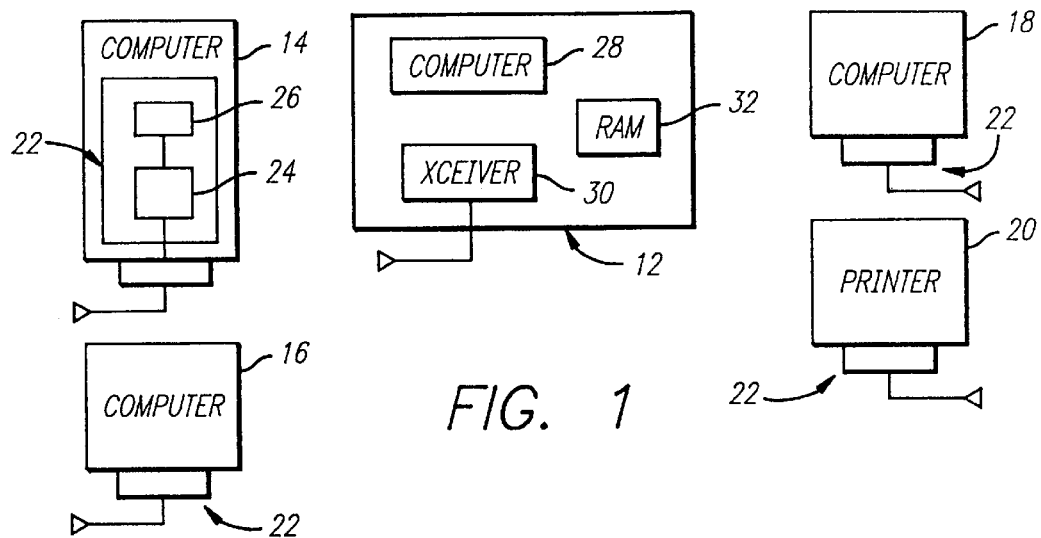
FIG. 1
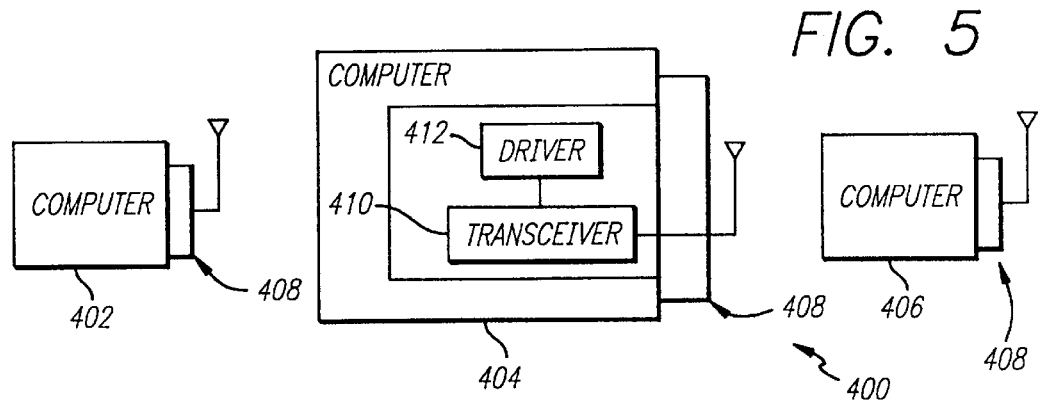
FIG. 5
FIG. 6
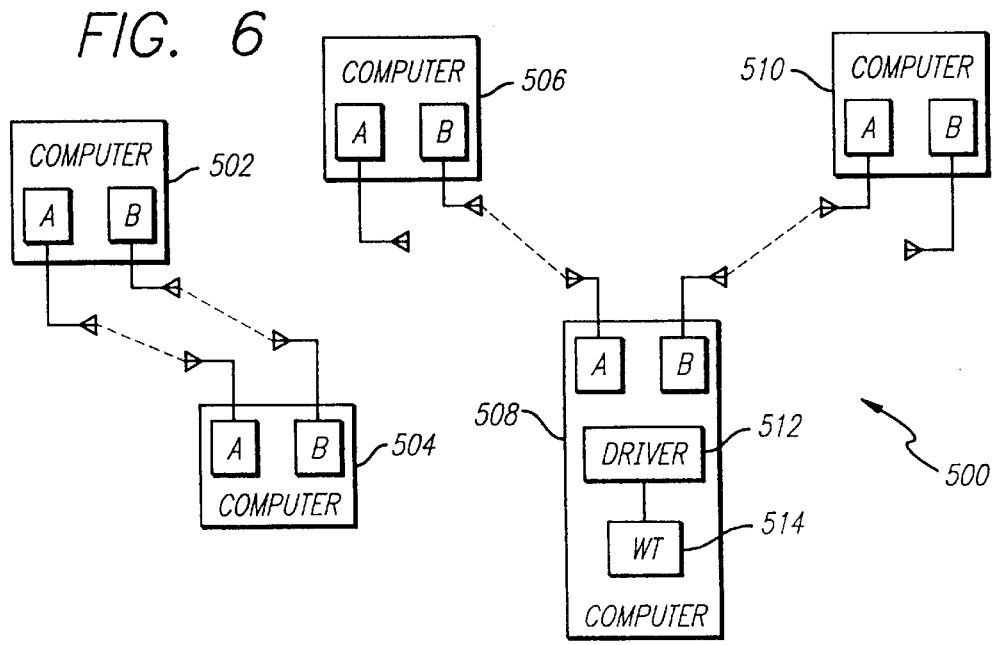

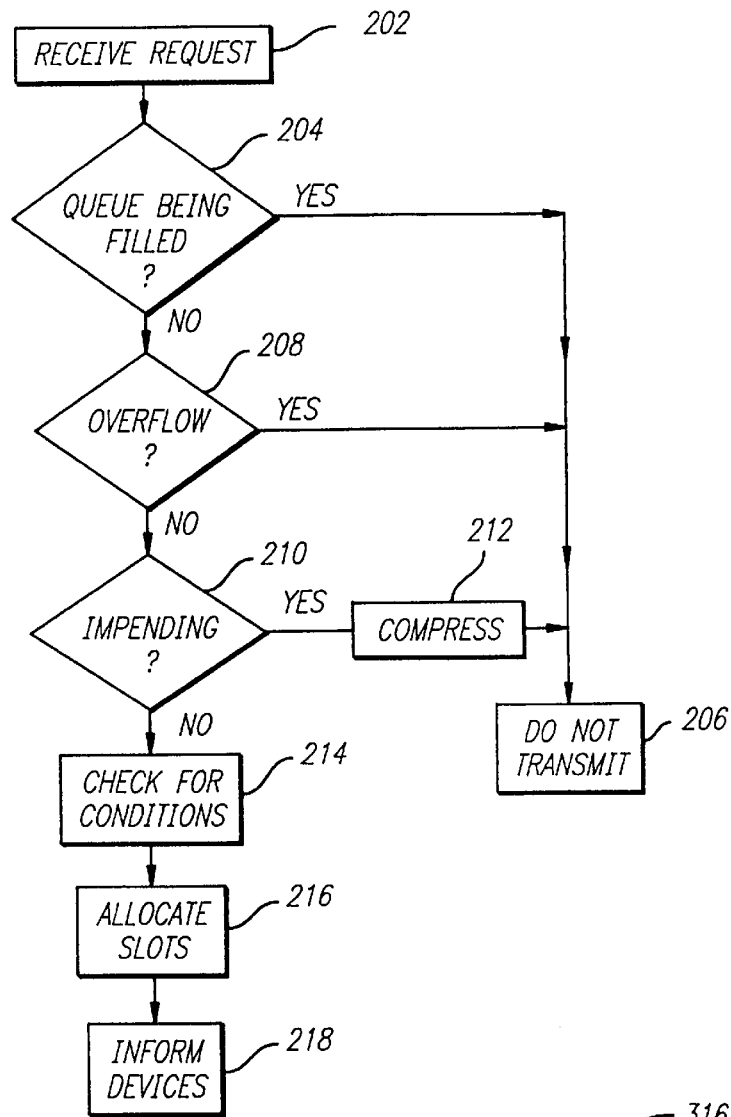
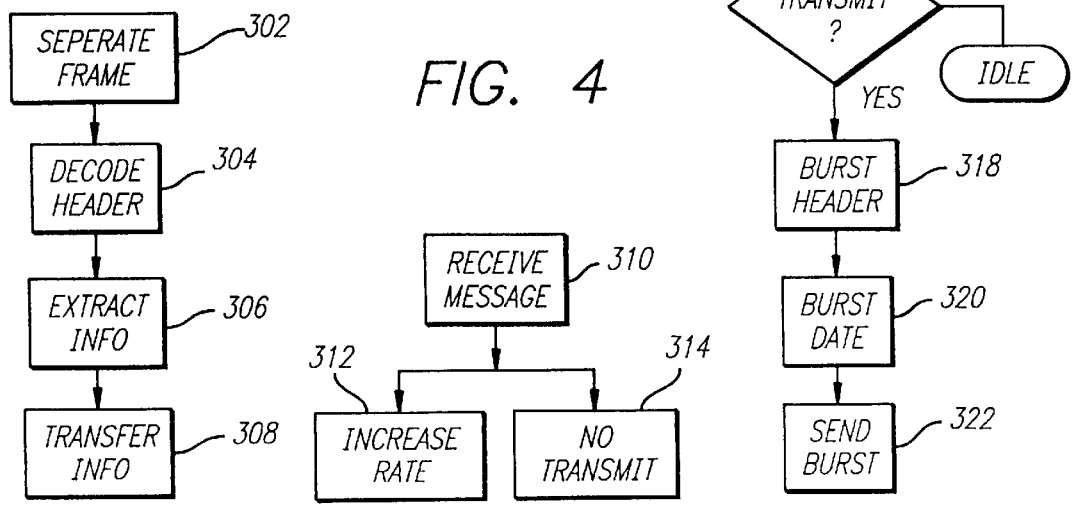
FIG. 3
FIG. 4

METHOD AND APPARATUS FOR INCREASING THE EFFECTIVE BANDWIDTH OF A DIGITAL WIRELESS NETWORK

BACKGROUND OF THE INVENTION

The invention relates in general to wireless communication systems and in particular to wireless local and wide area networks.

There was a time when mainframe computers ruled the workplace. The mainframe was a single high-powered computer located at a central site. Users worked on dummy terminals (i.e., displays and keyboards), which were connected to the mainframe. All programs and all data were stored in the mainframe, and all computations were performed by the mainframe. On mainframes such as the DEC VAX, processor time was allocated to the users based on priority. Low priority users had to share the processor time, while high priority users worked in real-time, monopolizing the processor time until their jobs were completed. Delays resulted from heavy usage among low priority users and from high priority users whose jobs were lengthy. Additionally, mainframes were expensive to purchase and expensive to maintain, requiring a cooled environment and at least one full-time operator.

Then came personal computers, workstations and networks, which ended the reign of the mainframes. Personal computers and workstations contained their own processors, allowing the users to work in real time. Networks allowed the personal computers to share information among each other. They also allowed expensive hardware (e.g., printers) and software to be located at one personal computer (a server) and shared among the other personal computers (clients). The networks were also affordable. It made economic sense for large companies to replace the expensive mainframes with networks of personal computers and workstations. Not only were the networks affordable for large companies, they were affordable for small companies and offices that previously could not afford or justify mainframes. Today, mainframe computers are still in use, but primarily as storage devices. Personal computers, workstations and networks now rule the workplace.

The networks can be classified as local area networks (LANs) and wide area networks (WANs). WANs and LANs differ in several aspects. WANs operate over public networks (i.e., leased lines furnished by third paries such as telephone companies), whereas LANs operate over private networks (i.e., privately owned cables and components). WANs transmit data at rates on the order of thousands of bits per second, whereas LANs transmit data at rates on the order of millions of bits per second. WANs are more error prone because they cover large outdoor geographical areas. Bit Error Rates are on the order of 1 in $10^5$ bits transmitted. LANs, which are typically housed within buildings, have Bit Error Rates on the order of 1 in $10^9$ bits transmitted.

The concept of networking is evolving from wired networks to wireless networks. In a wired network, a signal flows from one device to another across a physical medium such as copper wire or and fiber optic. In a wireless network, a signal flows over the airwaves at a radio frequency. Devices in a wireless network are untethered; unlike the devices in a wired network, they can be moved freely and can tap into a source of information anytime, anywhere. The wireless network also eliminates two unbecoming aspects of wired networks: the unsightliness of cables, and the expense of cable installation.

However, the success of the wireless network will ultimately rest upon its ability to handle large amounts of information in real time. Nowadays, networked computers are being used for the communication of divergent types of information including computer coded graphics and text, audio and video. The information could come in large volumes of data from commercial databases and electronic mail. The information could come in the form of real time video and audio, as required for video conferencing. The information could come from computers that share computer power in multiprocessor multitasking environments, where highly parallel computing is performed with all available computers on a network system. In the future, computers will be faster, and real time information will be needed in even larger volumes.

Wireless networks operating at RF frequencies are presently unable to handle the large amount of information, even by the current standards. When the quantity of information on the network becomes excessively high, the quality of the channel deteriorates. Also, the heavy "traffic" increases the transmission errors, thus inversely reducing the "throughput," the amount of information that can be actually communicated on a channel. Because high error rates are unacceptable, the transmission rates must be lowered in order to decrease the errors. Effectively, the bandwidth of the network is reduced.

It is an object of the present invention to increase the effective bandwidth of a wireless network.

SUMMARY OF THE INVENTION

According to a broad aspect of the present invention, a wireless network comprises a plurality of devices, each of which has at least one transceiver operable over an RF bandwidth. The network further comprises at least one interface that allows the plurality of devices to communicate with each other. The RF bandwidth is dynamically allocated among the devices by the at least one interface. Units of the bandwidth are apportioned among the devices according to the requirements of the devices.

One embodiment of the wireless network according to the present invention is a Time Division Multiple Access network. Another embodiment is a wireless Ethernet. Yet another embodiment is a Frequency Division Multiplexed network.

BRIEF DESCRIPTION OF THE DRAWINGS

FIG. 1 is a block diagram of a TDMA wireless network according to the present invention;

FIG. 3 is a flowchart of steps performed by a network manager for the dynamic allocation of bandwidth among four network devices on an uplink frequency;

FIG. 4 is a flowchart of the steps performed by the device driver for each device;

FIG. 5 is a block diagram of a wireless Ethernet according to the present invention; and FIG. 6 is a block diagram of an FDM wireless network according to the present invention.

DETAILED DESCRIPTION OF THE PREFERRED EMBODIMENTS

Figure 2:
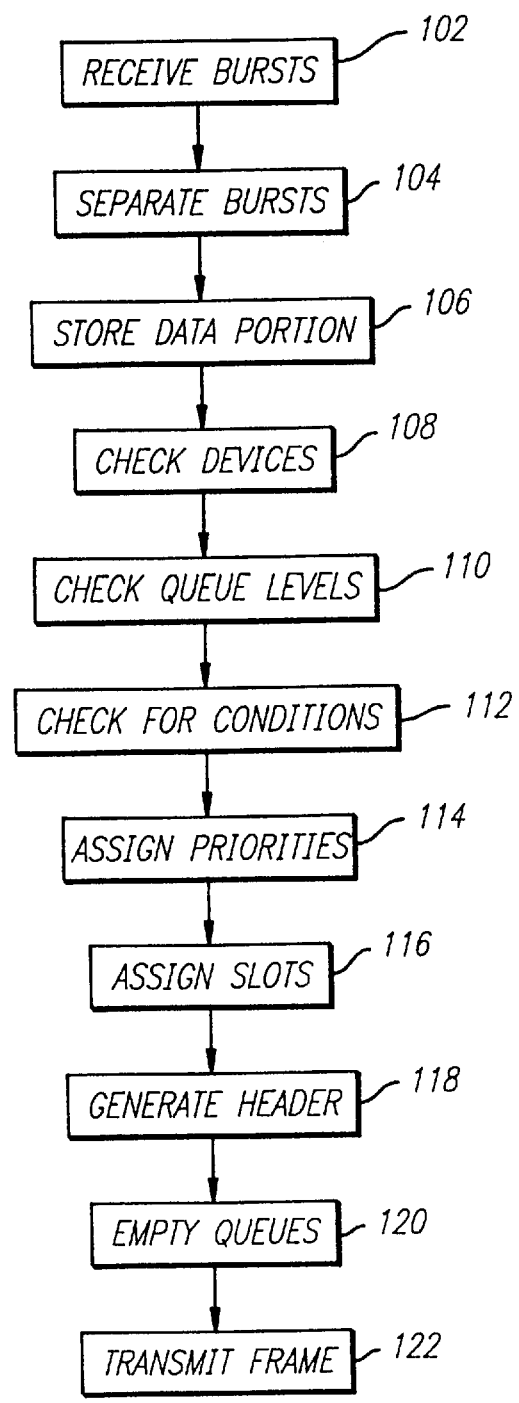
FIG. 2 is a flowchart of steps performed by a network manager for the dynamic allocation of bandwidth among four network devices on a downlink frequency, the network manager and devices being shown in FIG. 1.

FIG. 1 depicts a wireless network 10 including a network manager 12 and four devices: a first computer 14, a second computer 16, a third computer 18 and a printer 20. Although four devices 14, 16, 18 and 20 are depicted, any number of devices can be "connected" to the network 10. Also, any type of device can be connected to the network. Types of devices include, but are not limited to: personal computers, workstations, file servers, scanners, and plotters.

The devices 14, 16, 18 and 20 communicate with the network manager 12 over the airwaves at radio frequencies. On a downlink frequency, the network manager sends transmission frames to the devices 14, 16, 18 and 20. On an uplink frequency, the devices 14, 16, 18 and 20 send transmission bursts to the network manager 12. A bidirectional setup frequency allows the network manager 12 and devices 14, 16, 18 and 20 to establish communication links.

Mounted to the backplate of each device 14, 16, 18 and 20 is an interface card 22. Each interface card 22 includes a transceiver 24, which transmits the bursts over the uplink and setup frequencies and which receives frames over the downlink and setup frequencies. Each interface card 22 also includes a device driver 26, a processor that is programmed to control the transceiver 24 and provide an interface between the transceiver 24 and the device's operating system.

The network manager 12 is essentially a dedicated computer 28 equipped with a transceiver 30 for transmitting frames over the downlink and setup frequencies and for receiving bursts over the uplink and setup frequencies. The computer 28 includes Random Access Memory (RAM) 32 having a section that is apportioned into a plurality of queues. A queue is a First-In, First-Out (FIFO) buffer. At least one queue is provided for each device 14, 16, 18 and 20.

The network manager 12 communicates with the devices 14, 16, 18 and 20 using a Time Division Multiple Access (TDMA) technique. The RF bandwidth is broken up into a number of time slots, and the time slots are allocated to the devices 14, 16, 18 and 20 by the network manager 12.

Operation of the network manager 12 is illustrated by the following example. The first computer 14, ready to have a text file printed, transmits the text file to the network manager 12. The network manager 12 buffers the text file and determines whether the printer 20 is ready to print the text file. When the printer 20 is ready, the network manager 20 transmits the text file to the printer 20. While the printer 20 is printing out the text file, the second computer 16 becomes ready to transmit a bitmap file for printing. Once the first computer 14 has finished transmitting, the network manager 12 instructs the second computer 16 to transmit the bitmap file. The second computer 16 transmits the bitmap file, and the network manager 12 buffers the transmitted bitmap file. While the second computer 14 is transmitting to the network manager 12, the third computer 18 transmits a file of full-motion video images, destined for the second computer 16. The network manager 12 now must receive data from the second computer 16 and video from the third computer 18. However, the RF bandwidth cannot accommodate all the simultaneous transmission of audio and video.

Therefore, the network manager 12 allocates the time slots among the devices 14, 16, 18 and 20. Allocation is performed by assigning multiple time slots to the devices needing the greatest bandwidth.

FIG. 2 illustrates the steps performed by the network manager 12 for allocating the RF bandwidth among the devices 14, 16, 18 and 20 on the downlink frequency. The network manager 12 receives the bursts from the devices 14, 16, 18 and 20 (step 102). Each burst includes a header portion which specifies a destination device and a data portion. For each burst, the network manager 12 separates the header portion from the data portion (step 104). The data portion is stored in the queue corresponding to the device specified in the header portion (step 106). Thus, for the example above, the network manager 12 includes four queues for the four devices 14, 16, 18 and 20. The text file from the first computer 14 is stored in the printer queue. Stored on top of the text file is the bitmap file from the second computer 16. The video images from the third computer 18 are stored in third computer queue.

When it becomes time to transmit the contents of the queues, the network manager 12 performs steps 108–116, generates a transmission frame in steps 118–120 and transmits the frame in step 122. In step 108, the network manager 12 determines which devices 14, 16, 18 and 20 are ready to receive information. If a device such as the printer 20 is not ready to receive information (because its buffer is full, for example), its queue will be assigned a low priority. This will allow the bandwidth of the downlink frequency to be allocated to the other devices 14, 16 and 18.

In step 110, the network manager 12 examines the levels of the queues. A high priority is assigned to a queue that is approaching overflow. Overflow is a condition that should be avoided. If a queue overflows, contents of the queue will be lost. Allocating extra bandwidth to a device will allow its corresponding queue to be emptied faster.

In step 112, the network manager 12 checks for special conditions. Certain emergency conditions can result in high priorities being assigned. In the example above, the video images are transmitted by the third computer 18 at the same time the second computer 16 is transmitting the bitmap file. If the second computer 16 needs to transmit the bitmap file immediately, a high priority is assigned to the second computer queue and/or a low priority is assigned to the third computer queue. This assignment will allow the second computer 16 to complete its transmission of the bitmap file before the third computer 18 transmits the video images. In this manner, the entire bandwidth of the downlink frequency is allocated to the second computer 16.

In step 114, the network manager 12 assigns priorities to the queues. The prioritizes are based on the determinations made in steps 108–112.

In step 116, slots are assigned to the queues. Each frame includes a control header and a data section. The data section is divided into a plurality of slots. One slot is provided for each device 14, 16, 18 and 20. However, this does not mean that one slot is assigned to the queue of each device. Instead, the slots are assigned by priority. Using the example above, no slots are assigned to the queues for the first and third computers 14 and 18, since no information is being transmitted to those devices 14 and 18. This allows the four slots to be allocated among the second computer 16 and printer 20. Since the second computer 16 is receiving greater amounts of information (video images) than the printer 20 (a bitmap file), it requires greater bandwidth. Therefore, three slots are assigned to the queue of the second computer 16, with the remaining slot being assigned to the queue of the printer 20. Thus, bandwidth is taken from the first and third computers 14 and 18 and given to the second computer 16 and printer 20.

In step 118, the network manager 12 generates a control header indicating the slots assignments. For example, the header can include a device number corresponding to each slot.

In step 120, the network manager 12 empties the contents of the queues into their assigned slots, and in step 122 transmits the frame on the downlink frequency to all of the devices 14, 16, 18 and 20. Even if the data section of the frame is empty, the network manager 12 still transmits a dummy frame.

Steps 116–120 can be implemented using a different approach. The frame still includes a header portion and a data section. However, the data section includes an pre-assigned slot for each device queue and a number of spare slots. In step 116, only the spare slots are assigned to the queues having the highest priorities. In step 118, the control header is generated to indicate only device numbers for the spare slots. In step 120, the contents of the queues are emptied into the pre-assigned slots, and the contents of the highest priority queues are additionally emptied into the spare slots.

Using the example above, the pre-assigned slots for the second computer 16 and printer 20 are filled with the contents of the second computer and printer queues (the pre-assigned slots for the first and third computers 14 and 18 are empty because their queues are empty). Additionally, the spare slots are filled from the queues of the second computer 16 and printer 20. If the bandwidths of the second computer 16 and printer 20 are allocated equally, an equal number of spare slots are assigned to the queues of those devices 16 and 20. If a larger bandwidth is required by the second computer 16, more than half of the spare slots are assigned to it.

Since the network manager 12 and device drivers 26 for the devices 14, 16, 18 and 20 are programmable, the network 10 can use either approach described in steps 116–120. The network 10 could even use both approaches. The approaches could be changed on the fly by the network manager 12, which indicates the change to the devices 14, 16, 18 and 20 on the setup channel.

FIG. 3 illustrates the steps performed by the network manager 12 for allocating the RF bandwidth on the uplink frequency. A device 14, 16, 18 or 20 initiates a transmission burst by sending a request to the network manager 12 on the setup channel. The request includes a destination device and a word count of the information to be sent to the destination device. The network manager 12 receives the request (step 202) and determines whether the queue of the destination device is being filled by another device (step 204). If the destination queue is being filled, the network manager 12 responds with a transmission on the setup frequency, the transmission requesting the device not to transmit its burst (step 206). If the destination queue is not being filled, the network manager 12 examines the destination queue for overflow (step 208). If the queue is already full, the network manager 12 requests the device not to transmit its burst(step 206). If the bursts would cause overflow (step 210), the network manager 12 sends a transmission on the setup channel for the device to increase the rate at which its information is compressed and not to transmit (steps 212 and 206). After increasing the rate, the device responds with a new request including a reduced work count.

If the destination queue is ready to be filled, the network manager 12 checks for special conditions among the devices (step 214). After performing the check, the network manager allocates the slots among the devices 14, 16, 18 and 20 (step 216). The devices 14, 16, 18 and 20 are informed of the assignments on the setup frequency (step 218). Using the example above, the printer 20 does not transmit information and, therefore, is not assigned any slots on the uplink frequency. The first computer 14 is not assigned any slots after it has completed its transmission of the text file. Once the first computer 14 has finished transmitting, the slots on the uplink frequency are allocated among the second and third computers 16 and 18. Because the third computer 18 is transmitting video, it requires a greater bandwidth than the second computer 16, which is transmitting a bitmap file. Accordingly, the third computer 18 is allowed to transmit over more slots than the second computer 16.

FIG. 4 illustrates the steps performed by the device driver 26 of each device 14, 16, 18 and 20. When the transceiver 24 receives a frame from the network manager 12 on the downlink frequency, the device driver 26 separates the header portion from the data portion (step 302), decodes the header portion to determine which slots are assigned to its device (step 304), and extracts information only from the slots assigned to its device. The extracted information is stored in a buffer (step 306) and transferred to the device's processor (step 308).

When the transceiver 24 receives a message from the network manager 12 on the setup frequency (step 310), the device driver 26 decodes the message to determine whether it should increase the compression rate (step 312) or not transmit (step 314).

If the transceiver 24 has begun transmitting information on the uplink frequency to the network manager 12 (step 316), the device driver 26 formulates a burst header (step 318) and transfers data from the device's processor into the data portion of the burst (step 320). Then, the device driver 26 commands the transceiver 24 to transmit the bursts at the assigned time slots (step 322).

Certain advantages are inherent in the network 10. The network 10 is automatically configured to allocate the RF bandwidth according to the nature of the device 14, 16, 18 and 20. The printer 20, for example, does not transmit information to the computers 14, 16, and 18; therefore, it never makes a transmission request. Thus, its slots on the uplink frequency are always allocated among the computers 14, 16 and 18. The network 10 is also automatically configured to allocate the bandwidth according to the configuration of the device 14, 16, 18 and 20. If the first computer 14 is reconfigured to display video images only, it will not transmit information to the other computers 14, 16, and 18; therefore, its transmission slot on the uplink frequency will also be allocated among the second and third computers 16 and 18.

FIG. 5 shows a wireless Ethernet 400 including three devices: a first computer 402, a second computer 404 and a third computer 406. The Ethernet 400 is a baseband network, providing only a single channel for RF communications across the airwaves. Consequently, only one device 402, 404 or 406 can transmit at a time. However, the device 402, 404 or 406 can use the entire RF bandwidth.

Mounted to the backplate of each device 402, 404 and 406 is an Ethernet card 408. Included on each Ethernet card 408 is a transceiver 410, which allows a device 402, 404 or 406 to transmit and receive information over the airwaves, and a device driver 412, which interfaces the transceiver 410 with the device's processor. The device driver 412 is itself a processor that is programmed to decode incoming transmissions for the computer's operating system and encode data from the operating system for outgoing transmissions.

The cabling specification of the wireless Ethernet 400 is different from that of a wired Ethernet, but the signaling specifications of the wireless Ethernet 400 and wired Ethernets are virtually the same. Generally, the Ethernet includes specifications for network cabling (OSI Model layer 1) and signaling (OSI Model layer 2). The specifications were originally developed in the late 1970s. In the 1980s, a baseband, CSMA/CD computer communication network over coaxial cabling was promoted, a "Blue Book Standard" was published, and Ethernet Version 1 was released. This standard was later enhanced, and in 1985 Ethernet II was released. Then the IEEE (Institute of Electrical and Electronics Engineer) began Project 802 and used Ethernet Version 2 as the basis for the 802.3 CSMA/CD network standard. The IEEE 802.3 standard is generally interchangeable with Ethernet Version 2. The greatest difference between Versions 1 and 2 is the construction of the network packet header The device driver 412 of the wireless Ethernet 400 employs a media access control known as CSMA/CD ("Carrier Sense Multiple Access, with Collision Detection"). CSMA/CD determines how information is placed on the airwaves. Before a device 402, 404 or 406 places information on the airwaves, its device driver 412 determines whether another device is already transmitting. Once the device driver 412 determines that the airwaves are clear, it commands the transceiver 410 to start transmitting information. In the meantime, it determines whether another device had started transmitting at the same time (if two devices transmit at the same time, a "collision" occurs).

The device driver 412 also performs bandwidth allocation by varying the rates of at which the transceiver 410 compresses the information that it transmits. Say, for example, the first device 402 is ready to transmit. The device driver 412 of the first device 402 commands its transceiver 410 to send out a ready-to-transmit signal on a setup frequency. If the second device 404 is already transmitting and detects a signal on the setup channel, the device driver 412 of the second device 404 increases the rate at which its transceiver 410 compresses the information. The increase in compression rate has the effect of shortening the bandwidth of the second device 404. Transceivers that utilize variable rates of compression are disclosed in U.S. Ser. No. 08/580,547 filed herewith (Attorney Docket No. P-2816) and incorporated herein by reference. The transceiver therein supports variable rate compression and utilizes multiple compression algorithms.

A standard transmission "packet" for the wireless Ethernet 400 includes a 62-bit Preamble, which is used by the transceiver 410 to acquire bit synchronization; a two-bit Start of Frame Delimiter, which is used to acquire bit alignment; a six-byte Destination Address; a six-byte Source Address; a two-byte Length or Type Field; Data, which can be between 46 bytes and 1500 bytes; and a four-byte Frame Check Sequence. Compression rates are embedded in the Data. Short packets of Data must be padded to 46 bytes. The shortest packet (including the compression rate and compression type) is 60 bytes, while the longest packet is 1514 bytes.

The interface card 408 could be modified to operate according to IEEE 802.5, the standard for Token-Ring-based LANs. Token Ring is a type of LAN that has stations wired in a ring, where each station constantly passes a special message (a "token") on to the next. The device having the token can send a message. To transmit full-motion video in a token, the video and audio signals would be compressed using the dynamic allocation method described in U.S. Ser. No. 08/580,547 (Attorney Docket No. P-2816) above.

FIG. 6 shows a broadband network 500 including first, second, third, fourth and fifth devices 502, 504, 506, 508 and 510. The broadband network 500 uses a technique called "frequency division modulation". The RF bandwidth is divided into ten different channels, with each channel having its own unique carrier frequency. The different frequencies are multiplexed over the airwaves in such a way to allow multiple simultaneous "conversations" to occur. Each device 502, 504, 506, 508 and 510 is equipped with two transceivers A and B. Thus, the network 500 has ten receivers, each being "tuned" to a unique carrier frequency and being unable to receive signals tuned to the other carrier frequencies. The transmitter of each transceiver A and B can be tuned to different carrier frequencies.

Each device 502, 504, 506, 508 and 510 transmits information to a destination device by utilizing a device driver 512 and a lookup table 514. The lookup table 514 specifies the two unique frequencies of the receiver of each destination device 502, 504, 506, 508 and 510. The driver 512 tunes its transceivers A and B to transmit at the frequencies specified in the lookup table 514. For each transceiver A and B, the carrier signal is modulated with the encoded data and transmitted to the destination device. CSMA/CD is employed to avoid collisions.

For example, the first device 502 can send video images over two channels, simultaneously, to the second device 504. At the same time, the fourth device 508 can receive a single audio transmission from the third device 206 and, simultaneously, send data to the fifth device 510. Thus, the first device 502 is allocated maximum bandwidth for transmitting information, and the second device 504 is allocated maximum bandwidth for receiving information. The amount of information on any one channel can be increased by varying the compression rates as described above.

Because the networks 10, 400 and 500 are wireless, their devices 14, 16, 18, 20, 402, 404, 406, 502, 504, 506, 508 and 510 can be moved to any location, provided that they have sufficient power to communicate with each other. Power of the transmissions must be established to appear as distant noise signals to devices beyond the physical boundary of the network 10. In this regard, the distinction between LAN and WAN is blurred. The present invention can be configured as a LAN if its devices use low power transceivers, and it can be configured as a WAN if its devices use high power transceivers.

It will be understood that the embodiments described herein are merely exemplary and that many modifications and variations of the present invention are possible in light of the above teachings. Therefore, the scope of the present invention is limited only by the appended claims.

We claim:

1. A wireless network comprising:
   a plurality of devices, each device having at least one transceiver operable over an RF bandwidth;
   at least one interface that allows the plurality of devices to communicate with each other, the RF bandwidth being dynamically allocated among the devices by the at least one interface, the at least one interface performing the dynamic allocation by apportioning units of the RF bandwidth among the devices according to requirements of the devices;
   wherein the units are time slots, the bandwidth being proportional to the number of time slots, whereby the network is a TDMA network;
   wherein the at least one interface comprises:
   another transceiver that communicates with the at least one transceivers of the plurality of devices; and
   a computer that performs the dynamic allocation on information communicated between the plurality of devices and the second transceiver;

wherein the another transceiver communicates with the plurality of devices simultaneously on a downlink frequency, and wherein the another transceiver communicates with each device during a different time slot on an uplink frequency;

wherein the computer performs the steps of:

receiving bursts on the uplink frequency from the at least one transceivers of the devices, each burst including a data portion and a header portion, the header portion specifying a destination device for the data portion;

storing the data portions in buffers corresponding to the destination devices, the data portions partially filing each buffer;

determining and assigning priorities to the buffers in accord with the extent to which each buffer is filled by the data portions; and supplying contents of the buffers to the transceiver according to the assigned priorities, partially emptying the buffers.

2. The network of claim 1, wherein the transceiver transmits frames to the devices on the downlink frequency, each frame including a header portion and a plurality of slots, and wherein the computer performs the supplying step by:

assigning the slots to the buffers according to the priorities;

setting bits in the header portion to indicate the slot assignments;

emptying the contents of the buffers into their assigned slots; and supplying the frames to the transceiver.

3. The network of claim 2, wherein the computer performs the additional steps of:

examining the levels of the buffers for overflows; and assigning additional slots to device buffers approaching overflow.

4. The network of claim 2, wherein the computer assigns all of the slots to the devices according to the priorities.

5. The network of claim 2, wherein the plurality of slots include a plurality of pre-assigned slots and a plurality of spare slots, and wherein the computer assigns the spare slots to the buffers according to the priorities.

6. The network of claim 1, wherein the computer performs the additional steps of:

receiving requests from the devices on the uplink frequency;

allocating slots on the uplink frequency individually to the devices making the requests; and sending a message to the devices making the requests, the message indicating the slot allocations.

7. The network of claim 6, wherein the computer performs the additional steps of:

examining the buffers for overflow; and if overflow is impending for a buffer, sending a message to the corresponding device to increase its signal compression rate.

8. The network of claim 1, wherein the units are transmission intervals, bandwidth being proportional to the number of transmission intervals, whereby the network is a wireless Ethernet.

9. The network of claim 8, wherein an interface is provided for each device of the plurality, the interface for each device of the plurality including a driver coupled to its corresponding transceiver, each driver performing the steps of:

formulating packets for transmission by the corresponding transceiver;

decoding packets received by the corresponding transceiver; and varying the compression rates of the packets for transmission, whereby an increase in the rate of compression decreases the number of transmission intervals.

10. The network of claim 9, wherein the transceiver of each device broadcasts a signal on an auxiliary frequency when said transceiver is ready to transmit packets, and wherein in response to the receipt of said signal on said auxiliary frequency the driver of a device transmitting packets at the time of receipt of said signal on said auxiliary frequency increases the compression rate for the transmitted packets.

11. The network of claim 10, wherein the driver of each device employs CSMA/CD.

12. The network of claim 1, wherein the units are frequencies, bandwidth being proportional to the number of frequencies, whereby the network is an FDM network.

13. The network of claim 12, wherein each device includes:

a plurality of transceivers operable over the RF bandwidth, each transceiver being configured to receive RF signals at a unique frequency; and an interface, the interface including a lookup table that specifies the unique frequencies of at least some of the transceivers in the network; and a driver that configures at least one of the transceivers of the corresponding device to transmit at a frequency specified in the lookup table.

14. The network of claim 13, wherein the driver of each device employs CSMA/CD.

15. A Network Manager for a TDMA-based wireless network, comprising:

a transceiver that receives bursts at different time slots on an RF uplink frequency and that transmits frames on an RF downlink frequency; and a computer that receives the bursts from the transceiver, each burst including a data portion and a header portion, the header portion specifying a destination address for the data portion, the computer performing the steps of:

storing the data portions in buffers individually corresponding to the destination addresses, the data portions partially filling the buffers;

determining and assigning individual priorities of the buffers in accord with the extent to which the data portions fill the buffers individually; and supplying contents of the buffers to the transceiver according to the assigned priorities, partially emptying the buffers.

16. The Network Manager of claim 15, wherein each frame includes a control header and a plurality of slots, and wherein the computer performs the supplying step by:

assigning the slots to the buffers according to the priorities;

setting bits in the control header to indicate the slot assignments;

emptying the contents of the buffers into their assigned slots; and supplying the frames to the transceiver.

17. The Network Manager of claim 15, wherein the computer performs the additional steps of:

receiving requests on the network;

allocating slots on the uplink frequency within which the devices may transmit bursts based on the requests; and broadcasting a message indicating the slot allocations.

18. A method of communicating over a wireless network, comprising the steps of:

communicating with a plurality of devices over an RF bandwidth;

dynamically allocating the dynamic bandwidth among the devices by apportioning units of the RF bandwidth among the devices according to requirements of the devices;

wherein the communicating step includes the steps of transmitting frames on a downlink frequency and receiving bursts on an uplink frequency, each burst including a data portion and a header portion, the header portion specifying a destination address for the data portion; and wherein the allocating step includes the steps of providing at least one buffer memory for each destination address, buffering the data portions in the respective one of said at least one buffer memory in an order corresponding to the destination addresses; utilizing the buffered data portions to partially fill the respective buffer memory, determining and assigning priorities of the buffered data portions in accord to the extent to which the data portions fill the buffer memory individually; and transmitting the buffered data portions according to the assigned priorities.

19. The method of claim 18, wherein frames are transmitted on the downlink frequency, each frame including a header and a plurality of slots, and wherein the transmitting step includes the steps of:

assigning the slots to the buffered data portions according to the priorities;

setting bits in the control header to indicate the slot assignments;

emptying the buffered data portions into their assigned slots; and transmitting the frames on the downlink frequency.

20. The method of claim 19, further comprising the steps of:

examining the amounts of buffered data portions for overflows; and emptying the buffered data portions into additional slots when the buffered data portions approach overflow.

21. The method of claim 19, wherein all of the slots are assigned according to the priorities.

22. The method of claim 19, wherein the plurality of slots include a plurality of pre-assigned slots and a plurality of spare slots, and wherein the spare slots are assigned according to the priorities.

23. The method of claim 19, wherein bandwidth is allocated on the uplink frequency by performing the steps of:

receiving requests on the network;

allocating slots on the uplink frequency within which the devices may transmit bursts according to the requests; and broadcasting a message indicating the slot allocations.

24. The method of claim 18, wherein bandwidth allocation is performed by the steps of:

formulating packets for transmission over the entire RF bandwidth; and varying the compression rates of the packets for transmission, whereby an increase in the rate of compression reduces the allocated bandwidth.

25. The method of claim 24, further comprising the steps of:

broadcasting a signal on an auxiliary frequency indicating a readiness to transmit packets; and increasing the compression rate in response to the signal broadcast on the auxiliary frequency.

26. The method of claim 18, wherein the bandwidth allocation is performed by the steps of:

accessing a lookup table specifying a plurality of unique RF frequencies in the network; and transmitting over at least one of the frequencies specified by the lookup table.

* * * * *